US007162993B2

(12) United States Patent
Bailey et al.

(10) Patent No.: US 7,162,993 B2
(45) Date of Patent: Jan. 16, 2007

(54) INTERSECTING VANE MACHINES

(75) Inventors: H. Sterling Bailey, Los Gatos, CA (US); Stephen M. Chomyszak, Attleboro, MA (US)

(73) Assignee: Mechanology, Inc., Attleboro, MA (US)

( * ) Notice: Subject to any disclaimer, the term of this patent is extended or adjusted under 35 U.S.C. 154(b) by 0 days.

(21) Appl. No.: 10/744,230

(22) Filed: Dec. 22, 2003

(65) Prior Publication Data

US 2005/0133000 A1    Jun. 23, 2005

(51) Int. Cl.
*F02B 53/04*    (2006.01)
*F01C 1/08*    (2006.01)
*F01C 1/00*    (2006.01)
*F04C 18/00*    (2006.01)
*F04C 2/00*    (2006.01)

(52) U.S. Cl. .................. 123/221; 418/195; 418/207

(58) Field of Classification Search ............... 123/221, 123/232, 233, 239; 418/195, 207
See application file for complete search history.

(56) References Cited

U.S. PATENT DOCUMENTS 2,674,982 A * 4/1954 McCall .................. 123/221
3,060,910 A    10/1962 McCall .................. 123/221
3,841,276 A * 10/1974 Case ...................... 123/221
4,005,682 A *  2/1977 McCall et al. ........... 123/221
5,233,954 A    8/1993 Chomyszak ............. 123/221
6,729,295 B1    5/2004 Tomczyk ................ 123/221

FOREIGN PATENT DOCUMENTS

| DE | 886 542 | * | 7/1953 |
| DE | 4127870 A1 | * | 1/1992 |
| FR | 1 200 933 | * | 12/1959 |
| GB | 282038 | * | 10/1928 |

* cited by examiner

*Primary Examiner*—Thai-Ba Trieu
(74) *Attorney, Agent, or Firm*—Elmore Patent Law Group; Carolyn S. Elmore; Darlene A. Vanstone

(57) ABSTRACT

The invention provides a toroidal intersecting vane machine incorporating intersecting rotors to form primary and secondary chambers whose porting configurations minimize friction and maximize efficiency. Specifically, it is an object of the invention to provide a toroidal intersecting vane machine that greatly reduces the frictional losses through meshing surfaces without the need for external gearing by modifying the function of one or the other of the rotors from that of "fluid moving" to that of "valving" thereby reducing the pressure loads and associated inefficiencies at the interface of the meshing surfaces. The inventions described herein relate to these improvements.

21 Claims, 5 Drawing Sheets

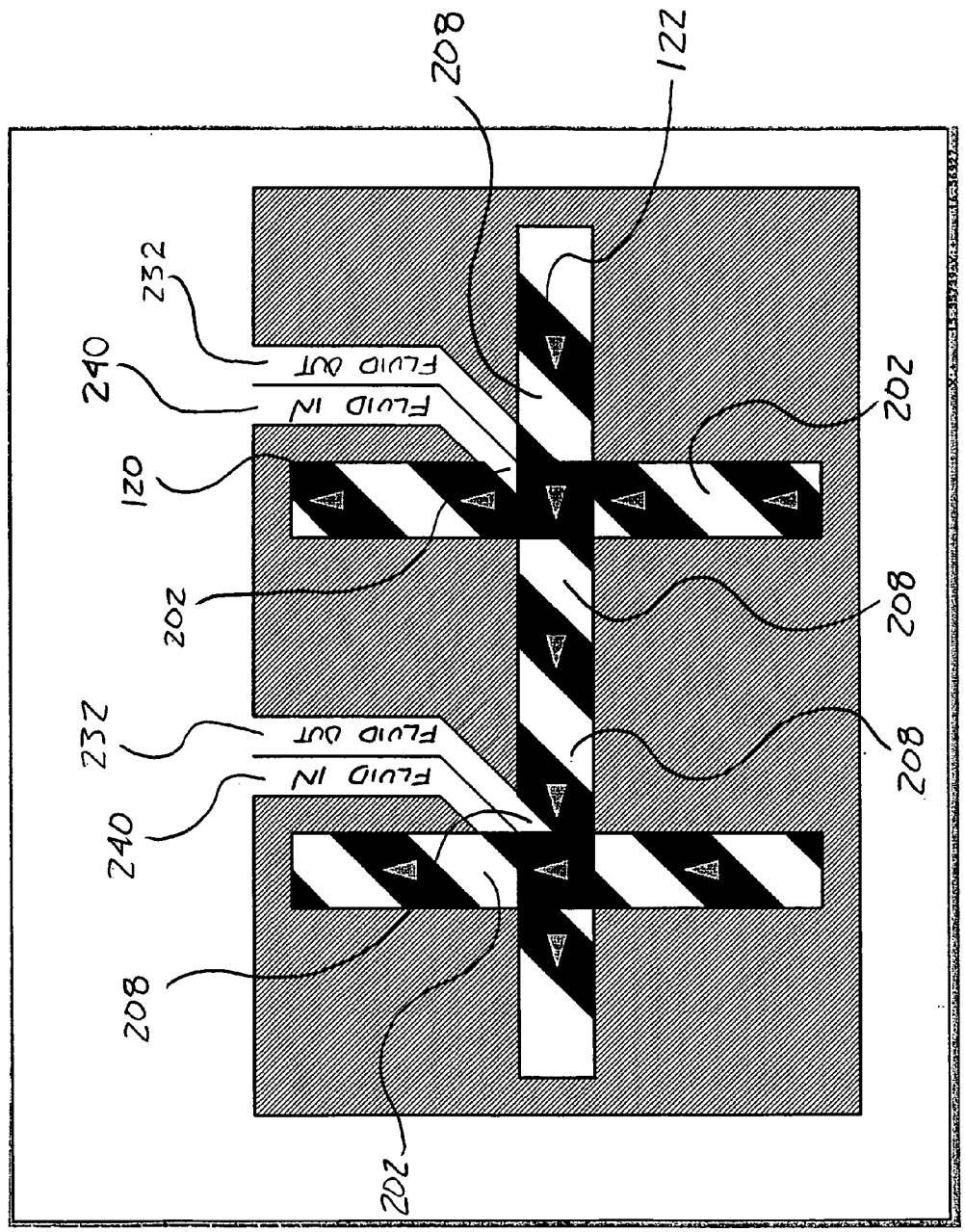

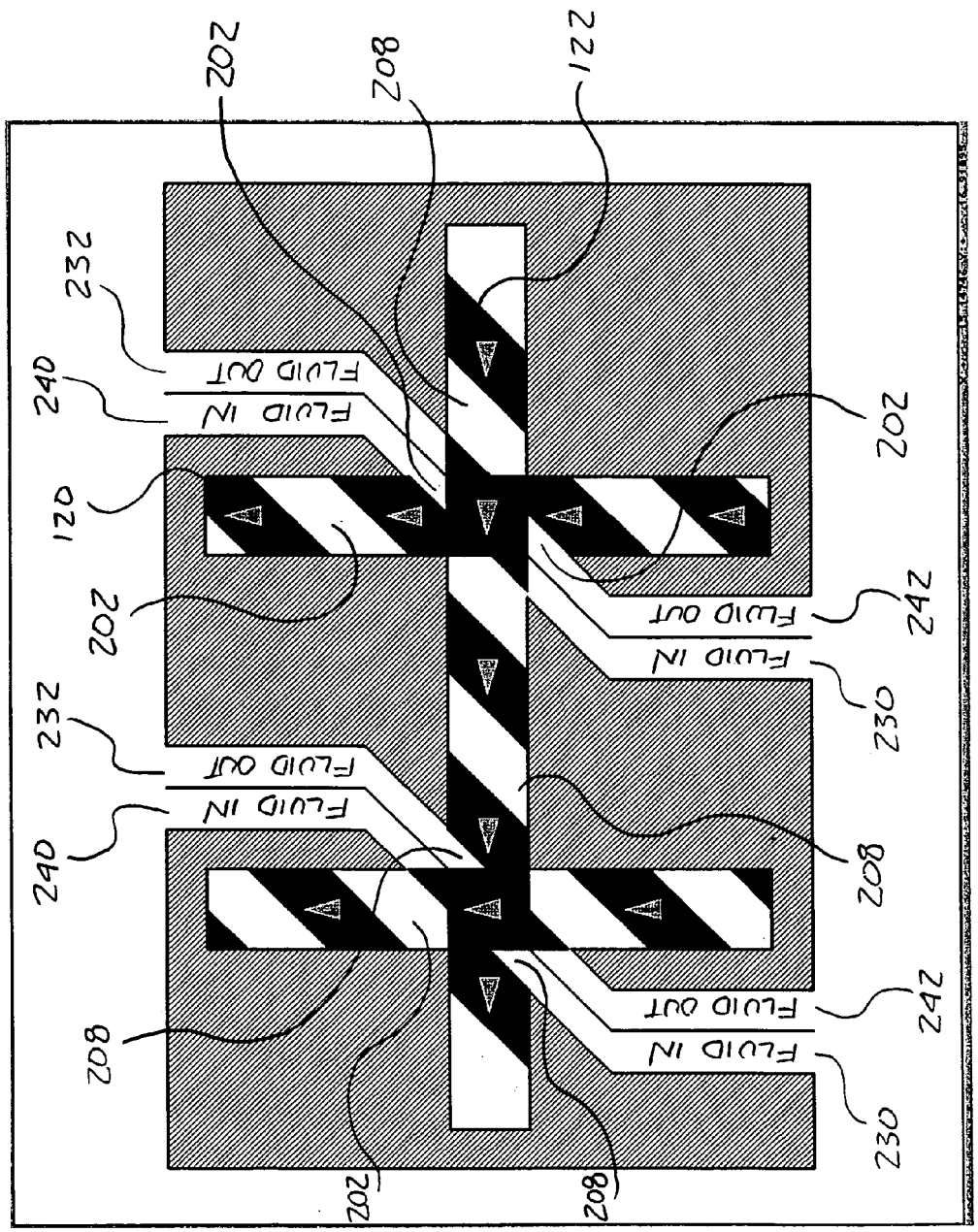
3001 - FIG 1B
PRIOR ART with additional ports

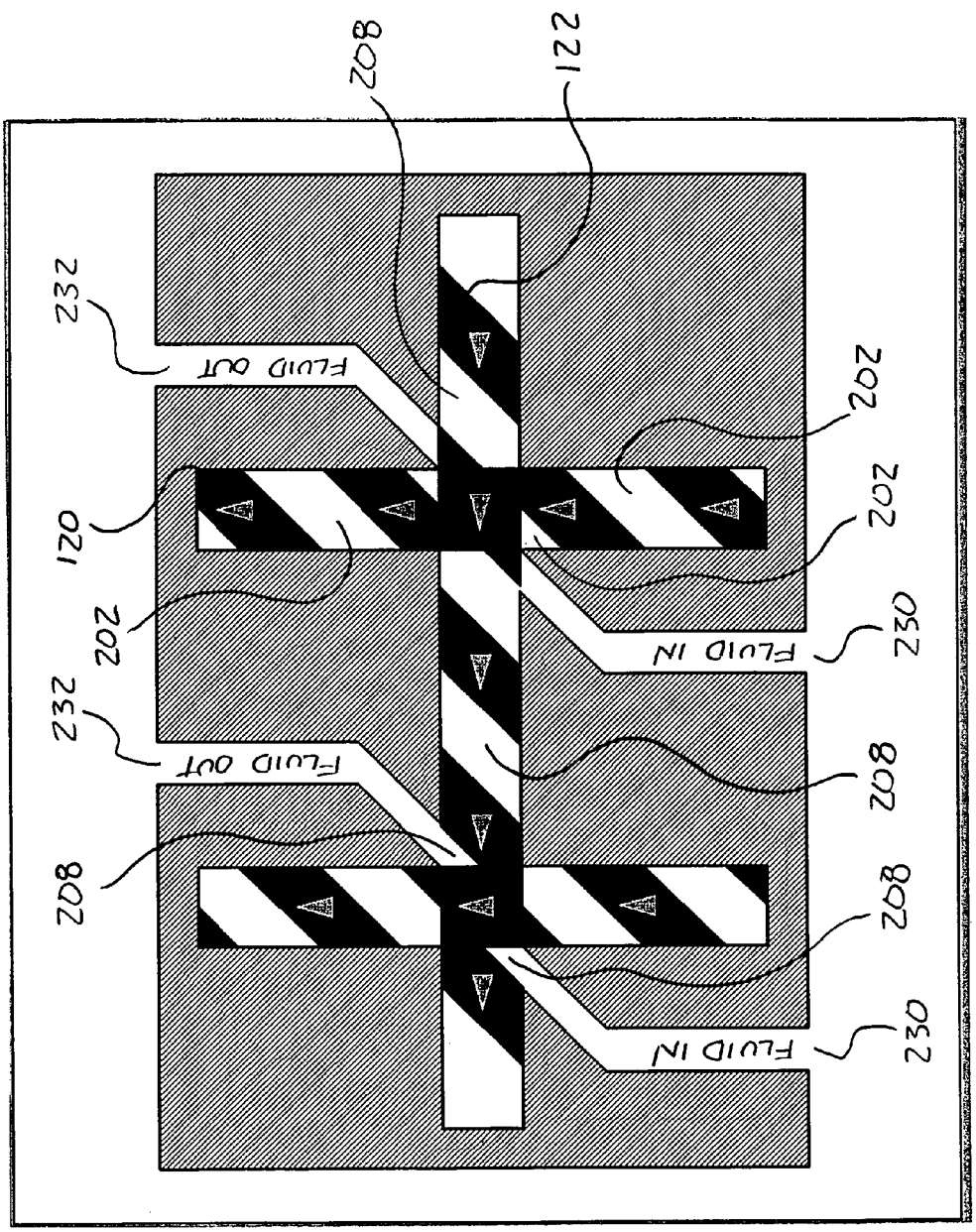

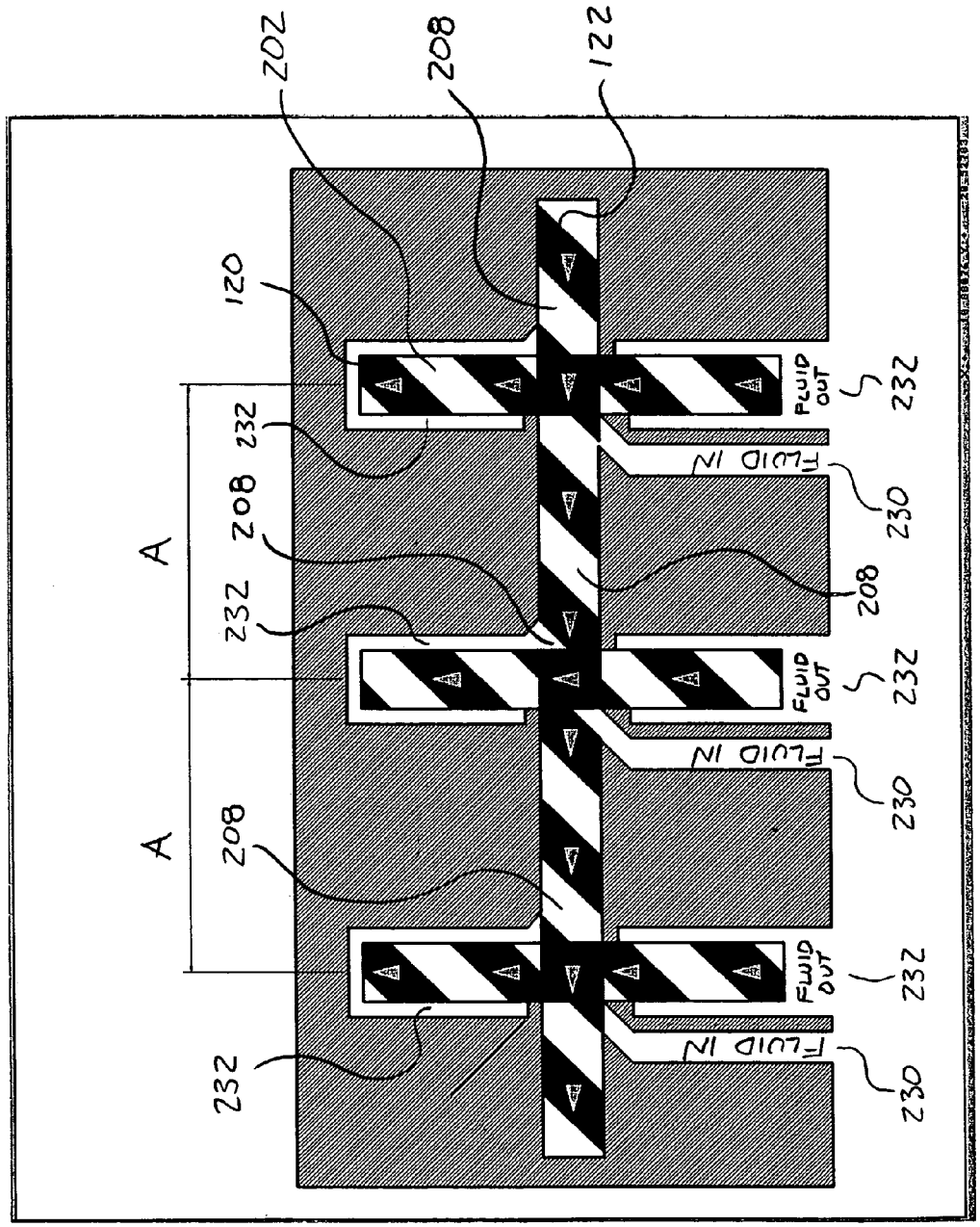

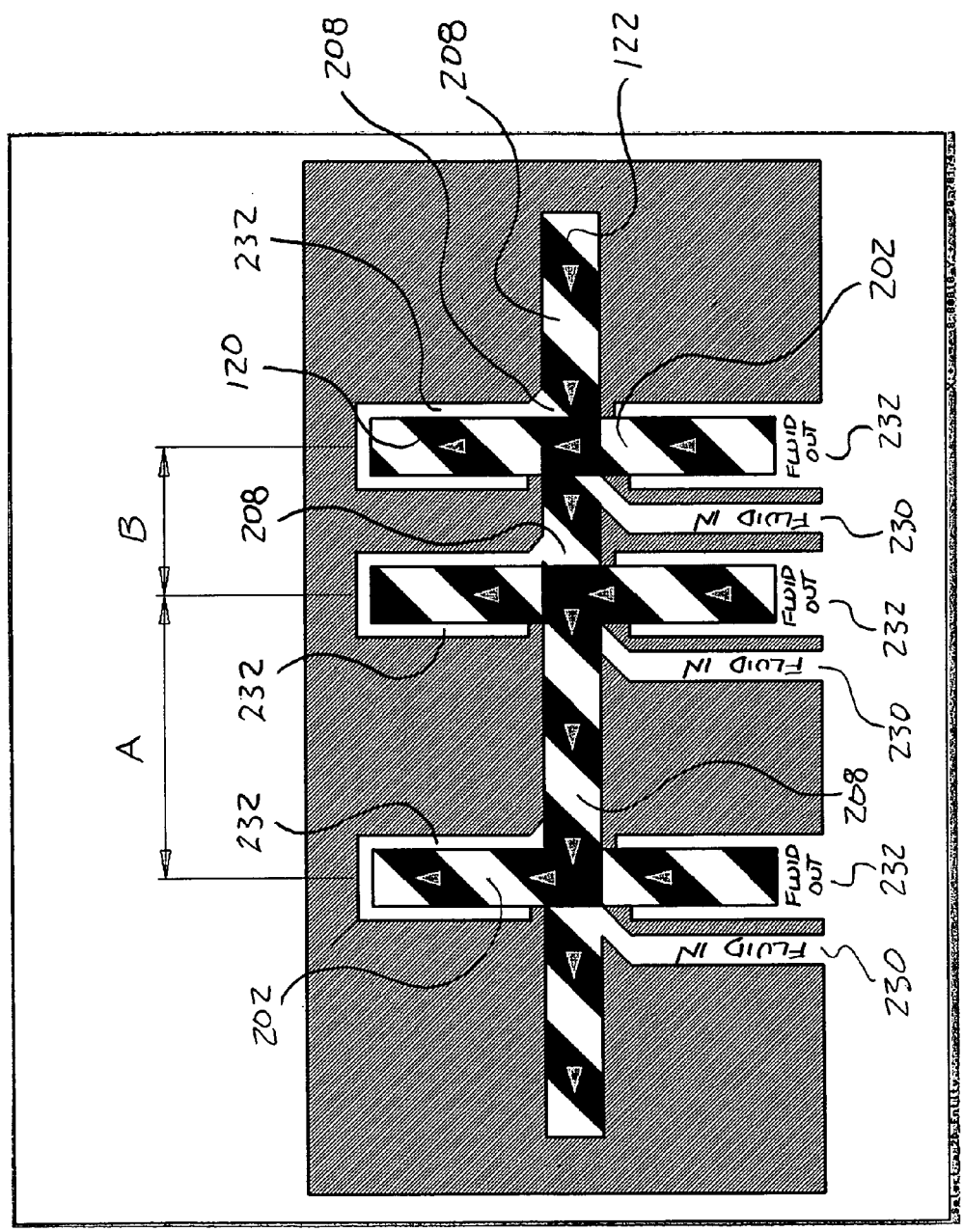

INTERSECTING VANE MACHINES

GOVERNMENT SUPPORT

The invention was supported, in whole or in part, by a grant from Department of Energy. The Government has certain rights in the invention.

BACKGROUND OF THE INVENTION

Machines incorporating intermeshing rotors have been described. See Chomyszak U.S. Pat. No. 5,233,954, issued Aug. 10, 1993 and Tomcyzk, U.S. Patent Application Publication 2003/0111040, published Jun. 19, 2003. The contents of the patent and publication are incorporated herein by reference in their entirety. However, improved efficiencies in these machines are desired.

SUMMARY OF THE INVENTION

Accordingly, it is an object of this invention to provide a toroidal intersecting vane machine incorporating intersecting rotors to form primary and secondary chambers with porting configurations that reduce friction and increase efficiency. Specifically, it is an object of the invention to provide a toroidal intersecting vane machine, including but not limited to a toroidal self-synchronized intersecting vane machine, that greatly reduces the frictional losses through meshing surfaces without the need for external gearing. This is accomplished by modifying the function of one or the other of the rotors from that of "fluid moving" to that of "valving" thereby reducing the pressure loads and associated inefficiencies at the interface of the meshing surfaces. The inventions described herein relate to these improvements.

Thus, the invention includes an intersecting vane machine comprising a supporting structure having an inside surface, a first rotor and at least one intersecting second rotor, preferably a plurality of rotors, rotatably mounted in said supporting structure, wherein:

(a) said first rotor has a plurality of first vanes positioned on a radially inner peripheral surface of said first rotor, with spaces between said first vanes and said surface defining a plurality of primary chambers;

(b) an intake port which permits flow of a fluid into said primary chamber and an exhaust port which permits exhaust of the fluid out of said primary chamber;

(c) said second rotor has a plurality of secondary vanes positioned on a radially outer peripheral surface of said second rotor, with spaces between said secondary vanes and said surface defining a plurality of secondary chambers;

(d) a first axis of rotation of said first rotor and a second axis of rotation of said second rotor arranged so that said axes of rotation do not intersect, said first rotor, said second rotor, first vanes and secondary vanes being arranged so that said first vanes and said secondary vanes (or abutments) intersect at only one location during their rotation; and (e) wherein the secondary vanes positively displace the primary chambers and pressurize the fluid in the primary chambers and the fluid in the secondary chambers is not substantially pressurized.

The invention is preferably a toroidal intersecting vane machine. In one embodiment, the invention is a self-synchronized intersecting vane machine. However, the features described herein can be applied to other intersecting vanes machines as well, including for example, a cylindrical intersecting vane machine.

In one embodiment, the second rotors are radially positioned about said first axis of rotation of said first rotor. The supporting structure conveniently comprises a plurality of wedge-shaped sectors, with the second rotors being encapsulated between adjacent sectors. The sectors can be the same size or different and can encapsulate a second rotor or not. The sectors, when combined, complete the circular plane parallel to the plane of rotation created by the first rotor. That is, the sum of the angles defining each wedge is 360 degrees. This configuration permits an easily adjustable machine having variability in flow rates, pressure differentials, etc.

Thus, the distance between each of the second rotors (or each pair of the rotors) can be the same or different. In one embodiment, the distance between at least two of the second rotors at the point of intersection with said first rotor is less than the length of said primary vane. This configuration allows the volume of the primary chamber, as filled by the intake port, to be less than the volume of the chamber when it completely clears the secondary vane. In another embodiment, the distance between at least two of the second rotors at the point of intersection with said rotor is greater than the length of said primary vane. This maximizes the amount of fluid that can be introduced into the primary chamber. In yet another embodiment, combinations of these configurations can be included.

Because the first and second rotors intersect, the paths of travel (or tracks) of the primary and secondary vanes intersect. The exhaust port can be located proximal to the point of intersection. Alternatively, the exhaust port can be located distally to the point of intersection. In one embodiment, the exhaust port can be along the path of travel of the secondary vanes. Further, the intake port can be located proximally to the point of intersection of the primary vanes and secondary vanes or the point of intersection of the paths of travel. Where the exhaust ports and intake ports are located at each point of intersection, the exhaust port can come into contact with a traveling primary vane before the primary vane comes into contact with the intake port. The exhaust ports are not in fluid communication with the intake ports.

The machine can be configured as a compressor, a pump, an expander or combinations thereof. It can include an external input power supply connected to drive the first and/or second rotors or it can include an external output power user. It can also be configured as an internal combustion engine.

In one embodiment, a leading edge of a vane of one rotor drives the trailing edge of a vane of another rotor or abutment, with the spacing of the vanes such that they are geometrically synchronized, thereby eliminating the use of an external gear train. For example, the leading surfaces of at least two consecutive primary vanes are in contact with the trailing surfaces of at least two consecutive secondary vanes. The embodiment relies upon the inherent design of the intersecting vane mechanism to provide related duties. The elimination of the extra apparatus for an external gear train thereby results in savings in complexity and cost.

In one embodiment, a self-synchronized toroidal intersecting vane machine is configured as a compressor, pump or expander or combination thereof where an external means for supplying initial input power is connected to a central shaft connect to said first or second rotors.

The machine can have a wide range of gear ratios. In one embodiment, the second rotors have a number of said secondary vanes equal to (1/GEAR RATIO)×(number of said primary vanes on said first rotor) where GEAR RATIO equals revolutions of each of said second rotors per revolution of said first rotor. Preferably, the gear ratio is at least 1:1, preferably at least 1.5:1.

Further, the machine can accommodate a large range of fluid flow rates and/or rotational speeds for each rotor. Of course, the fluid flow rate will be dependent upon the volume of each chamber and the rotational speed of the rotors. For example, the fluid flow rate can be greater than 0.005 cubic feet per minute (CFM), such as at least about 30 CFM, preferably at least about 250 CFM, or at least about 1000 CFM. Generally, the fluid flow rate will be less than 5 million CFM. The rotational speed of the rotors can also be varied widely. For example, the first rotor can rotate at a rate of less than 1 rotation per minute (RPM). However, it will generally rotate at much higher speeds, such as at least about 500 RPMs, preferably at least about 1000 RPMs, more preferably at least about 1500 RPMs. Similarly, the second rotors can rotate at a rate of less than 1 rotation per minute (RPM). However, it will generally rotate at much higher speeds, such as at least about 500 RPMs, preferably at least about 1000 RPMs, more preferably at least about 2000 RPMs.

In one embodiment, the total flow rate of fluid through the primary chambers can be at least 250 cubic feet per minute with a primary speed of said first rotor of at least 1700 rotations per minute. In one embodiment, the speed of said second rotors can be at least 3000 rotations per minute. In this preferred configuration, the ratio of the width of said secondary vanes to the width of said primary vanes can be less than 1:1, preferably less than 0.5:1. The primary chamber volume can be at least about 0.75 cubic inches, and/or the secondary chamber volume can be less than about 0.5 cubic inches.

In another embodiment, the porting configuration is reversed, as compared to the above. Thus, the secondary chambers are ported, allowing pressurization of the secondary chambers, and the primary chambers are not ported and are not pressurized.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 1A and 1B show schematics of the prior art invention wherein both the primary and secondary chambers are ported.

FIG. 2 shows a schematic of an embodiment of the present invention wherein the primary chamber only is ported.

FIG. 3 shows a schematic of an embodiment of the present invention wherein the exhaust port is configured within the path of the secondary vanes. This schematic also depicts the distance between rotors as being the same and exceeds the length of the primary vane.

FIG. 4 shows a schematic of an embodiment of the present invention wherein two rotors are distanced less than the length of the primary vane and two rotors are distanced greater than the length of the primary vane.

DETAILED DESCRIPTION OF THE INVENTION

The invention provides a substantially improved toroidal intersecting vane machine herein disclosed. In one embodiment, the invention is a self-synchronized toroidal intersecting vane machine. The invention has two or more rotors rotatably mounted within a supporting structure so that the vanes of each of the rotors pass through a common region or intersection. Between the vanes of each primary rotor exists chambers which contain and exchange a working fluid. Changes in volume of the chambers are made possible by the interaction of the vanes. Because the rotors and their vanes continuously rotate, they create a cyclic positive displacement pumping action which enables the processing of a working fluid. If heat is added to the process then the machine can be used as an engine. If heat is removed from the process then the machine can be used as a refrigeration device.

Toroidal geometry, on which this invention and its following embodiments are based, provides a very flexible design platform. Not only does it allow for a very compact mechanical package but provides numerous attributes which can be adjusted so as to optimize the pumping action and benefit the thermodynamic cycles which the invention may utilize. A key feature of this invention is its ability to allow configurable volumetric ratios between the initial and final volume of its working fluid. For example, in the case of an engine, this one feature provides the ability for significant increases in thermal efficiency.

FIG. 1A shows a schematic of the prior art invention with ports that serve the primary chambers 208 and secondary chambers 202. Secondary vanes 120 intersect with primary vanes 122; secondary chamber 202 is in fluid communication with fluid inlet port 240; primary chamber 208 is in fluid communication with fluid outlet port 232.

FIG. 1B shows a schematic of the prior art invention with fluid inlet port 230 for the primary chamber 208 and fluid outlet port 242 for the secondary chambers 202.

FIG. 2 shows a schematic of an embodiment of the present invention wherein the primary chamber only is ported, thereby eliminating selected ports. The numbering system of FIGS. 1A and 1B has been preserved.

FIG. 3 shows a schematic of an embodiment of the present invention wherein the exhaust port 232 is configured within the pat of the secondary vanes 120. This schematic also depicts the distance, A, between rotors as being the same and exceeds the length of the primary vane.

FIG. 4 shows a schematic of an embodiment of the present invention wherein two rotors are distanced, B, less than the length of the primary vane and two rotors are distanced, A, greater than the length of the primary vane.

The invention may be used, for example, in the machines and engines described in U.S. Pat. No. 5,233,954, which is incorporated herein by reference.

To allow good intermeshing and improved sealing, the inner peripheral surface of first rotor and primary vanes are transversely concave and the outer peripheral surfaces of the second rotors and secondary vanes are transversely convex, as described in U.S. Pat. No. 5,233,954.

The machine can be designed with any number of compressors or expanders, or second rotors, within the geometric limits imposed by the first rotor. It is preferred to dispose the second rotors in a radial orientation about the spin axis of the first rotor. It is possible to vary the displacement of the machine either by changing the dimensions of the rotors or by changing the number of rotors utilized. The number of secondary vanes per rotor is equal to (1/GEAR RATIO)*(the number of primary vanes used on the expansion rotor) where: GEAR RATIO equals the number of revolutions of rotor per revolution of first rotor.

In a self-synchronized embodiment, the machine is started by means of either a drive shaft, preferably but not necessarily, centrally located on one of the rotors, or the flow of fluid tangentially into the system. The drive shaft can be on one or more rotors. Further, the drive shaft can be on the primary or secondary rotors.

In one embodiment, the energy output of the machine is compressed air in a compression system. In another embodiment, the energy output is via a drive shaft in an expander system. In yet another embodiment, combinations of compression systems are on a single primary rotor.

In one embodiment, all of the rotors of the machine can act as a compression system. In another embodiment, all of the rotors can be acting as an expander system. In yet another embodiment, at least one compression system can be connected to at least one expander system with an energy flow between the two systems. The energy flow can be unidirectional or bi-directional. In yet another embodiment, a combustion device can be placed in between two such systems combining into a single system, preferably a self-synchronized system.

The stages of the thermodynamic cycle in an engine are described in U.S. Pat. No. 5,233,954, which is incorporated herein by reference. The improvements in the vane machines of the present invention can be readily adapted into an engine, as described therein.

The vanes of the rotors only need to maintain a seal during the compression and expansion phases and in the track where compression or expansion is desired. Because these phases occur in a relatively short time and within a small amount of actual rotor rotation, the friction due to sealing can be greatly reduced. A large percentage of the rotor's rotation can be unencumbered with sealing devices.

Where a chamber does not need to be pressurized or sealed, it is preferred that the track and/or vane be manufactured to allow the fluid in the track to flow or bypass another vane in that track and prevent pressurization. In one embodiment, the height and/or width of the track is greater than height or width of the vane (with any seal that may be disposed therein or thereon) and allows the fluid to bypass the vane as the vane travels in the track. In another embodiment, the top surface of the vane is configured to possess a groove along its length which allows fluid to bypass the vane.

The machine can be adapted to work with a single fluid or multiple fluids. The word "fluid" as used herein is intended to mean any liquid or gas. Examples of a fluid include but are not limited to air, water and fuel. Where multiple fluids are employed, they can be ported through the same or different input and exhaust ports, through the same or different secondary rotors or primary rotors.

The application of the improvements described herein can be applied to the embodiments of the machines described in U.S. Pat. No. 5,233,954 issued Aug. 10, 1993 and Tomcyzk, U.S. Patent Application Publication 2003/0111040, published Jun. 19, 2003 and other toroidal vane machines. The contents of the patent and publication are incorporated herein by reference in their entirety.

The dimensions and ranges herein are set forth solely for the purpose of illustrating typical device dimensions. The actual dimensions of a device constructed according to the principles of the present invention may obviously vary outside of the listed ranges with departing from those basic principles. Further, it should be apparent to those skilled in the art that various changes in form and details of the invention as shown and described may be made. It is intended that such changes be included within the spirit and scope of the claims appended hereto.

What is claimed is:

1. A toroidal intersecting vane machine, which comprises a supporting structure having an inside surface, a first rotor and at least one intersecting second rotor rotatably mounted in said supporting structure, wherein:
   (a) said first rotor has a plurality of first vanes positioned on a radially inner peripheral surface of said first rotor, with spaces between said first vanes and said surface defining a plurality of primary chambers;
   (b) an intake port which permits flow of a fluid into said primary chamber and an exhaust port which permits exhaust of the fluid out of said primary chamber;
   (c) said second rotor has a plurality of secondary vanes positioned on a radially outer peripheral surface of said second rotor, with spaces between said secondary vanes and said surface defining a plurality of secondary chambers;
   (d) a first axis of rotation of said first rotor and a second axis of rotation of said second rotor arranged so that said axes of rotation do not intersect, said first rotor, said second rotor, first vanes and secondary vanes being arranged so that said first vanes and said secondary vanes intersect at only one location during their rotation; and
   (e) wherein the secondary vanes positively displace the primary chambers and pressurize the fluid in the primary chambers and the primary vanes positively displace the fluid in the secondary chambers and do not substantially pressurize the fluid in the secondary chambers.

2. The machine of claim 1 wherein the secondary vanes are characterized by a groove along its length that permits fluid to bypass the vane.

3. A toroidal intersecting vane machine, which comprises a supporting structure having an inside surface, a first rotor and at least one intersecting second rotor rotatably mounted in said supporting structure, wherein:
   (a) said first rotor has a plurality of first vanes positioned on a radially inner peripheral surface of said first rotor, with spaces between said first vanes and said surface defining a plurality of primary chambers;
   (b) said second rotor has a plurality of secondary vanes positioned on a radially outer peripheral surface of said second rotor, with spaces between said secondary vanes and said surface defining a plurality of secondary chambers;
   (c) an intake port which permits flow of a fluid into said secondary chamber and an exhaust port which permits exhaust of the fluid out of said secondary chamber;
   (d) a first axis of rotation of said first rotor and a second axis of rotation of said second rotor arranged so that said axes of rotation do not intersect, said first rotor, said second rotor, first vanes and secondary vanes being arranged so that said first vanes and said secondary vanes intersect at only one location during their rotation; and
   (e) wherein the primary vanes positively displace the secondary chambers and pressurize the fluid in the secondary chambers and the secondary vanes positively displace the fluid in the primary chambers and do not substantially pressurize the fluid in the primary chambers.

4. The machine of claim 3 wherein the primary vanes are characterized by a groove along its length that permits fluid to bypass the vane.

5. A toroidal intersecting vane machine, which comprises a supporting structure having an inside surface, a first rotor and at least one intersecting second rotor rotatably mounted in said supporting structure, wherein:
  (a) said first rotor has a plurality of first vanes positioned on a radially inner peripheral surface of said first rotor, with spaces between said first vanes and said surface defining a plurality of primary chambers;
  (b) said second rotor has a plurality of secondary vanes positioned on a radially outer peripheral surface of said second rotor, with spaces between said secondary vanes and said surface defining a plurality of secondary chambers;
  (c) an intake port which permits flow of a fluid into said secondary chamber and an exhaust port which permits exhaust of the fluid out of said secondary chamber;
  (d) a first axis of rotation of said first rotor and a second axis of rotation of said second rotor arranged so that said axes of rotation do not intersect, said first rotor, said second rotor, first vanes and secondary vanes being arranged so that said first vanes and said secondary vanes intersect at only one location during their rotation;
  (e) wherein the primary vanes positively displace the secondary chambers and pressurize the fluid in the secondary chambers and the secondary vanes positively displace the fluid in the primary chambers; and
  (f) the primary vanes travel in a track characterized by a height and/or width which is greater than the primary vanes' height and/or width and allows fluid to bypass the vane.

6. The machine of claim 5 further comprising a drive shaft on the primary rotor or the secondary rotor, but not both.

7. The machine of claim 5 in which the machine is configured as a compressor or pump with an external means for supplying input power connected to drive said first and/or second rotors or is configured as an expander with an external means for using output power connected to said first and/or second rotors or combination thereof.

8. The machine of claim 5, wherein said primary chambers are not simultaneously in fluid communication with an intake port and an exhaust port.

9. The machine of claim 5, wherein the leading surfaces of at least two consecutive primary vanes are in contact with the trailing surfaces of at least two consecutive secondary vanes.

10. A toroidal intersecting vane machine, which comprises a supporting structure having an inside surface, a first rotor and at least one intersecting second rotor rotatably mounted in said supporting structure, wherein:
  (a) said first rotor has a plurality of first vanes positioned on a radially inner peripheral surface of said first rotor, with spaces between said first vanes and said surface defining a plurality of primary chambers;
  (b) an intake port which permits flow of a fluid into said primary chamber and an exhaust port which permits exhaust of the fluid out of said primary chamber;
  (c) said second rotor has a plurality of secondary vanes positioned on a radially outer peripheral surface of said second rotor, with spaces between said secondary vanes and said surface defining a plurality of secondary chambers;
  (d) a first axis of rotation of said first rotor and a second axis of rotation of said second rotor arranged so that said axes of rotation do not intersect, said first rotor, said second rotor, first vanes and secondary vanes being arranged so that said first vanes and said secondary vanes intersect at only one location during their rotation;
  (e) wherein the secondary vanes positively displace the primary chambers and pressurize the fluid in the primary chambers and the primary vanes positively displace the fluid in the secondary chambers and do not substantially pressurize the fluid in the secondary chambers; and
  (f) the secondary vanes travel in a track characterized by a height and/or width which is greater than the secondary vanes' height and/or width and allows fluid to bypass the vane.

11. The machine of claim 1 wherein the leading surfaces of at least two consecutive primary vanes are in contact with the trailing surfaces of at least two consecutive secondary vanes.

12. The machine of claim 1 comprising a plurality of said second rotors, radially positioned about said first axis of rotation, wherein said secondary chambers are not simultaneously in fluid communication with an intake port and an exhaust port.

13. The machine of claim 1 wherein the secondary vanes travel in a secondary track and said exhaust port is located in the secondary track.

14. The machine of claim 1 wherein the intake port is located proximally to the point of intersection of the primary vanes and secondary vanes.

15. The machine of claim 1 wherein the distance between each of said adjacent second rotors is the same.

16. The machine of claim 1 wherein the distance between each of said adjacent second rotors is different.

17. The machine of claim 1 wherein the distance between at least one pair of said second rotors is different from the distance between at least one other pair of said second rotors.

18. The machine of claim 1 wherein the distance between at least two of said second rotors at the point of intersection is less than the length of said primary vane.

19. The machine of claim 1 wherein the distance between at least two of said second rotors at the point of intersection is greater than the length of said primary vane.

20. The machine of claim 1 in which the machine is configured as a compressor or pump with an external means for supplying input power connected to drive said first and/or second rotors or is configured as an expander with an external means for using output power connected to said first and/or second rotors or combination thereof.

21. The machine of claim 1 further comprising a drive shaft on the primary rotor or the secondary rotor, but not both.

* * * * *